ACTUATING MECHANISM FOR RECORD CHANGER SPINDLE

Filed April 20, 1965

Inventor
Robert J. Hammond
By Brown, Jackson, Boettcher and Dienner Att'ys.

Aug. 15, 1967 R. J. HAMMOND 3,336,032

ACTUATING MECHANISM FOR RECORD CHANGER SPINDLE

Filed April 20, 1965

3 Sheets-Sheet 2

Inventor
Robert J. Hammond
By Brown, Jackson, Boettcher and Dienner Attys

Inventor
Robert J. Hammond
By
Brown, Jackson,
Boettcher and Dienner Att'ys.

United States Patent Office 3,336,032
Patented Aug. 15, 1967

3,336,032
ACTUATING MECHANISM FOR RECORD CHANGER SPINDLE

Robert J. Hammond, Stevensville, Mich., assignor to V-M Corporation, Benton Harbor, Mich., a corporation of Michigan Filed Apr. 20, 1965, Ser. No. 449,533
7 Claims. (Cl. 274—10)

ABSTRACT OF THE DISCLOSURE

An improvement to a self-supporting record changer center spindle of the type having a plurality of retractable record supporting fingers which normally project outward through vertical slots in a spindle body to support a stack of records on an upper storage portion of the spindle and which move downwardly to transport the lowermost of the stack, the preferred embodiment including finger carrying means for carrying the plurality of record supporting fingers disposed within the spindle body for vertical movement therein conjointly with the fingers, a train of balls disposed within the spindle body beneath the carrier means and engaging the same for controlling the vertical position of the carrier means, a multi-directional track for the train of balls, and actuating means such as the arm of a bell crank lever which engage the train of balls and is operative during a record change cycle to control vertical movement of the finger carrier means.

Figure 1:
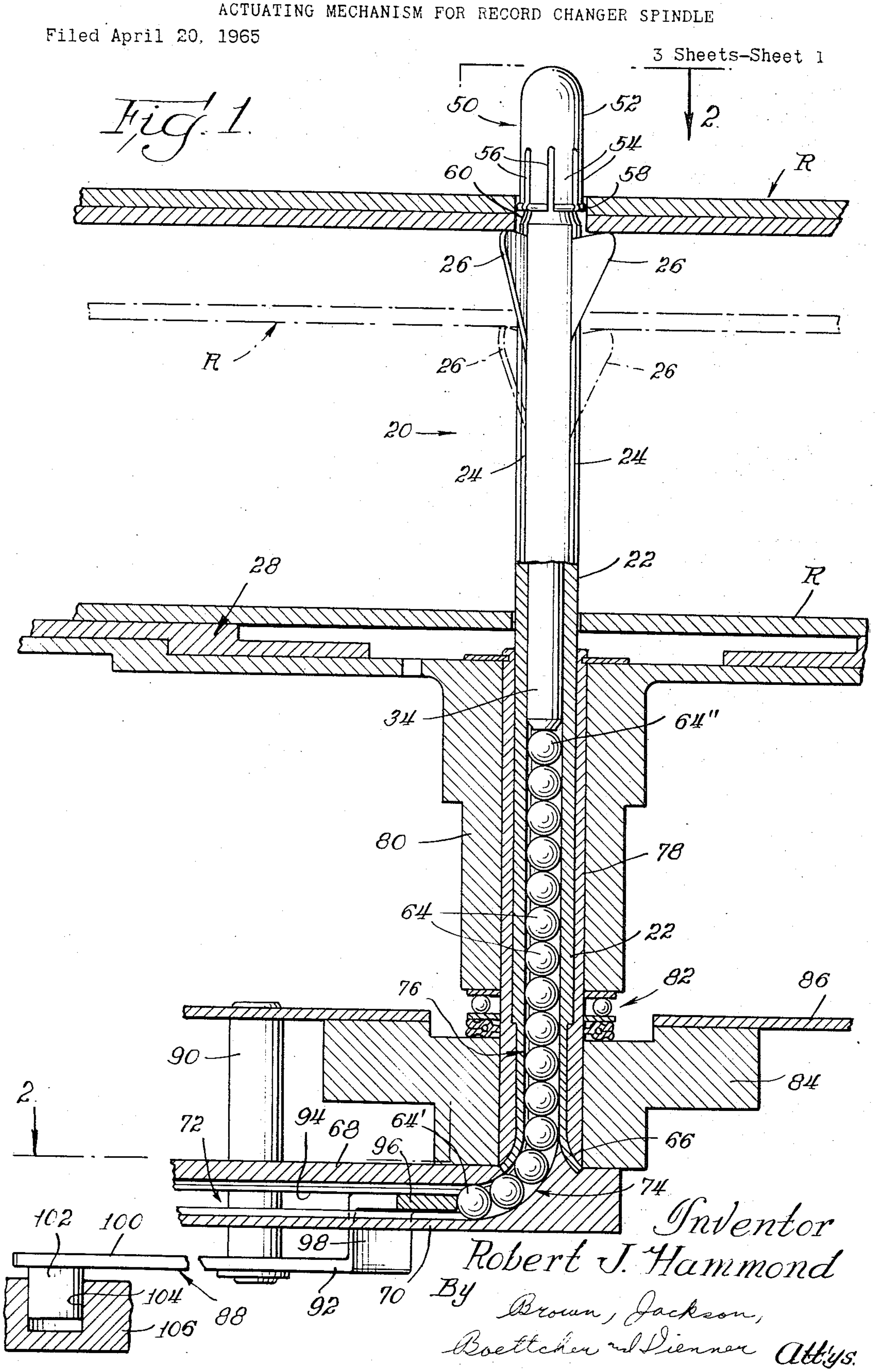

The present invention relates to an improved center spindle for a record changer. More specifically, the invention relates to mechanism for actuating a record changer spindle in order that records disposed on an upper storage portion of the spindle may be lowered one at a time to a turntable for playing.

The present invention is concerned with a record changer center spindle of the self-supporting type whereby a stack of records to be played is supported on an upper storage portion of the spindle without need for an overlying support arm or the like in order to stabilize the records. Such a self-supporting spindle includes primary record supporting means comprising a plurality of supporting fingers which normally project outwardly through slots in a spindle body in order to support a stack of records on the upper storage portion on the spindle and which are movable downwardly to release the lowermost record in the stack to a turntable for playing. A self-supporting spindle of the foregoing type further includes secondary record supporting means for supporting the remainder of the record stack on the upper storage portion of the spindle when the primary supporting means is withdrawn to lower the bottom record to the turntable.

In a particular type of self-supporting spindle to which the present invention relates, the slots in the spindle body extend from the upper storage portion of the spindle down approximately to the turntable. The purpose of such an arrangement is to permit the primary supporting fingers to be lowered substantially the entire distance to the turntable before being retracted to an inoperative position within the spindle body. Consequently, a record to be played is lowered substantially the entire distance from the upper storage portion of the spindle to the turntable while under the control of the primary supporting fingers, thereby eliminating the dropping of the record to the turntable.

While it is advantageous to lower a record to be played the entire distance to the turntable rather than to drop the record, it will be understood that such an arrangement requires that the primary supporting fingers move through a substantially increased vertical stroke during a record change cycle. Where a conventional spindle actuating mechanism is used, an increase in the vertical stroke of the record supporting fingers requires a corresponding increase in the vertical stroke of the associated actuating mechanism, thereby increasing the overall vertical dimensions of the record changer by a proportionate amount.

It is therefore an object of the present invention to provide for use with a self-supporting spindle an actuating mechanism which overcomes the foregoing problems by increasing the vertical stroke of the record supporting fingers without necessitating a proportional increase in the vertical dimensions of the overall spindle assembly.

A further object is to provide for a record changer spindle as last above-mentioned an actuating mechanism which moves in a multi-directional path so that its own operating stroke is at least partially along a non-vertical path thereby reducing the required vertical dimensions of the mechanism for a given desired vertical stroke of the primary record supporting fingers.

In furtherance of the foregoing objects, I provide spindle actuating mechanism including a train of steel balls which move along a path or ball track which is partially vertical and then curves so as to extend horizontally for a predetermined distance. The steel balls move up into the lower end of the spindle body so that one end of the train of balls acts upon a finger carrier or the like on which the primary record supporting fingers are mounted. In this manner, the balls control the vertical position of the record supporting fingers, since when the balls are moved in one direction along the ball path, one end of the ball train moves vertically up into the lower end of the spindle body so as to raise the record supporting fingers, and when the balls move in the opposite direction along the ball path, the finger carrier and supporting fingers mounted thereon are permitted to be lowered by gravity. When the supporting fingers are thus lowered, the train of balls or a portion thereof moves around a curved path and along a horizontal portion of the ball track thus serving to reduce the vertical dimensions of the actuating mechanism. In addition to achieving the latter advantage, the ball train actuating mechanism of the present invention operates in an unusually smooth and efficient manner, is extremely reliable in its operation, and can readily be designed to impart any desired operating stroke to the vertically movable record supporting fingers.

The foregoing and other objects and advantages of the invention will be apparent from the following description thereof.

Now in order to acquaint those skilled in the art with the manner of utilizing and practicing my invention, I shall describe, in conjunction with the accompanying drawings, certain preferred embodiments of the invention.

Figure 2:
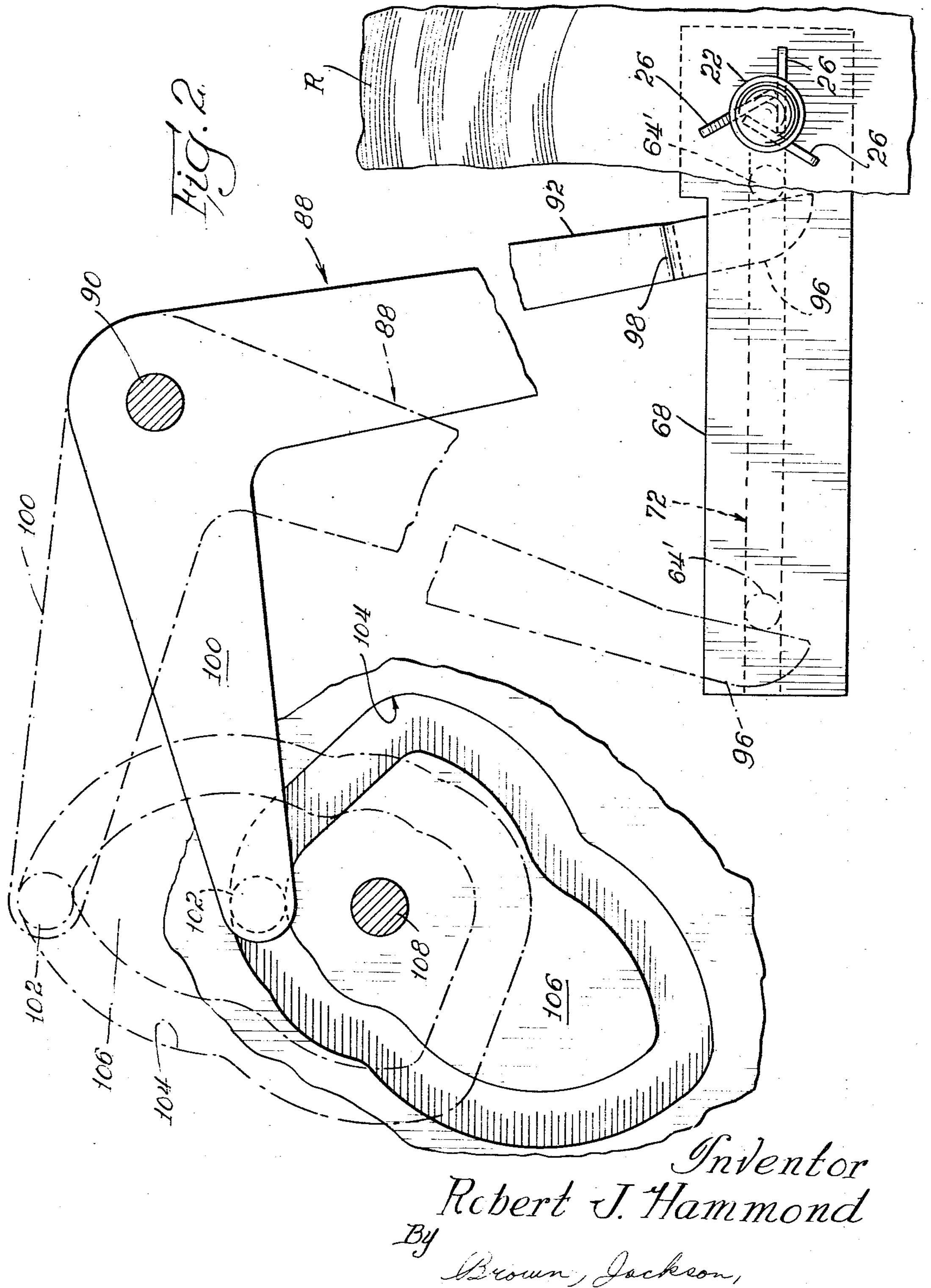
Figures 3, 4:
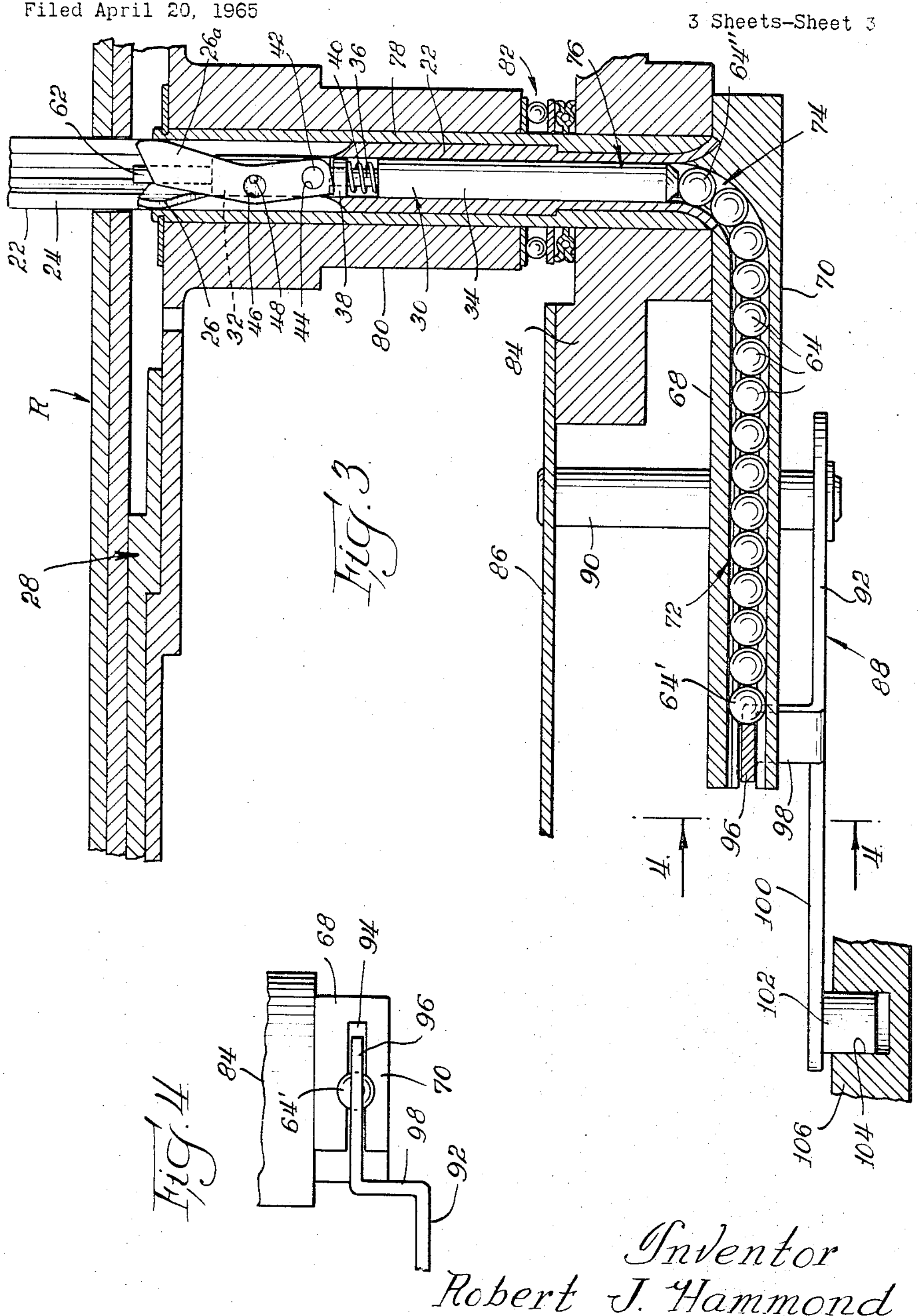

In the drawings:

FIGURE 1 is an elevational view, partly in section and partly broken away, of a self-supporting record changer center spindle having actuating mechanism constructed in accordance with the present invention, showing in solid lines a plurality of record supporting fingers in their normal positions so as to support a stack of records on an upper storage portion of the spindle, and showing the supporting fingers in dash lines in a partially lowered position as a record to be played is being lowered to a turntable;

FIGURE 2 is a horizontal sectional view, partly broken away, taken substantially along the line 2—2 of FIGURE 1, showing a cam and bellcrank lever arrangement for producing movement of a train of balls during a record change cycle in order to actuate the record supporting fingers;

FIGURE 3 is a fragmentary vertical sectional view showing the record supporting fingers at the lower end of their stroke wherein they are retracted within the spindle body to release a record to the turntable for playing, the train of balls which comprises the actuating mechanism also being shown in a lowered position wherein most of the balls are disposed in a horizontal portion of the ball track; and FIGURE 4 is a fragmentary sectional view taken substantially along the line 4—4 of FIGURE 3.

Referring now to the drawings, FIGURE 1 shows a self-supporting record changer center spindle 20 comprising a spindle body 22 having a plurality of vertical slots 24 formed therein through which a plurality of primary record supporting fingers 26 project in order to support a stack of records R on an upper storage portion of the spindle. In the embodiment being described there are three of the slots 24 and three suporting fingers 26 (see FIGURE 2), and the slots 24 extend from the upper storage portion of the spindle 20 down approximately to a turntable 28. FIGURE 3 shows a finger carrier assembly 30 comprising an upper triangular portion 32 on which the three fingers 26 are mounted, and a lower rod portion 34. Intermediate the upper and lower carrier portions 32 and 34 there is a reduced diameter rod portion 36 on which a collar 38 is vertically slidable, and the collar 38 is yieldingly urged upwardly by a compression spring 40 which encompasses the reduced rod portion 36 and is disposed beneath the collar.

Still referring to FIGURE 3, a supporting finger **26*a* is pivotally mounted on a stud 42 which projects from the carrier portion 32. The finger 26*a* is provided with an opening 44 to receive the stud 42, and is further provided thereabove with a second opening 46 into which a smaller diameter stud 48 projects from the carrier portion 32. The study 48 serves as a stop to limit the outward pivotal movement of the supporting fingers 26*a*. It will be understood that each of the supporting fingers 26 is pivotally mounted on the carrier portion 32 in the manner described above with respect to the finger 26*a*. In the embodiment described, the fingers 26 are mounted in respective planes which are each spaced from and parallel to the axis of the spindle body as shown in FIGURE 2. The supporting fingers 26 are yieldingly urged toward their outermost pivotal positions of FIGURE 1 by the slidable collar 38 which is biased upwardly against the undersides of the fingers by the spring 40. For a more complete description of the structure and operation of the supporting fingers 26**, reference should be had to the copending application of Gerald H. Freier, Ser. No. 445,381, filed Apr. 5, 1965, which application is assigned to the assignee of the present invention.

FIGURE 1 shows secondary record supporting means 50 comprising a cap 52 having a plurality of downwardly extending fingers 54 defined by a plurality of narrow vertical slots 56 formed in the cap 52. Each of the depending fingers 54 has a rib 58 formed on the outer surface thereof, and such ribs are located so as to be adjacent the periphery of the centerhole of the next-to-lowermost record in a stack of records R supported on the upper storage portion of the spindle by the primary supporting fingers 26. The cap 52 is vertically movable between an upper inoperative position wherein the fingers 54 are retracted with the ribs 58 thereon spaced inwardly from the centerhole edge of the next-to-lowermost record R, and a lower operative position wherein the fingers 54 are expanded outwardly to grip the next-to-lowermost record in the stack. The spindle body 22 is provided with an inclined cam portion 60 which serves to expand the fingers 54 to their operative positions when the cap 52 is lowered. The cap 52 is biased downwardly by spring means (not shown), and it is moved upwardly by an upwardly extending rod 62 (see FIGURE 3) provided at the top of the finger carrier 32. It should be understood that the secondary record supporting means 50 is described herein merely by way of example, and various other means may be utilized for supporting all but the lowermost record in the stack when the latter record is being lowered to the turntable 28 for playing. An alternative form of secondary supporting means is described in the above-mentioned copending application of Gerald H. Freier, Ser. No. 445,381, filed Apr. 5, 1965.

The most important feature of the present invention comprises the mechanism for lowering and raising the primary supporting fingers 26, and such mechanism will now be described. As shown in FIGURE 1, a plurality of steel balls 64 are disposed within the lower end of the spindle body 22 for movement upwardly and downwardly therein. The extreme lower end of the spindle body 22 is flared outwardly at 66 at which location the ball track curves from the vertical to the horizontal. The horizontal portion of the ball track is formed by a pair of upper and lower guide plates 68 and 70 which together define a horizontal track portion 72, and a curved track portion 74 which blends into a vertical track portion 76, the latter comprising the lower end of the spindle body 22. It will be seen that a sleeve bearing 78 surrounds the lower end of the spindle body 22, and the turnable 28 includes an integral sleeve 80 which is rotatably mounted over the bearing 78 and is vertically supported by a thrust bearing 82, the latter being positioned between the lower end of the turntable sleeve 80 and a mounting plate 84. The mounting plate 84 is secured to the underside of a record changer subplate 86.

The movement of the steel balls 64 in the ball track is controlled by a bellcrank lever 88 which is pivotally mounted at the lower end of a stud 90 which depends from the subplate 86. Referring to FIGURES 1 and 2, the bellcrank lever 88 has one arm 92 which projects through a slot 94 between the guide plates 68 and 70 so that an end portion 96 on the arm is disposed immediately behind the last ball 64′ in the ball track. The arm 92 extends upwardly at 98 to permit the end portion 96 to move in a higher horizontal plane at the level of the horizontal ball track portion 72. The bellcrank 88 has a second arm 100 which carries a cam follower roller 102 on the end thereof, and the roller 102 is positioned in a continuous cam track 104 formed in a cam 106 which rotates about the axis of a shaft 108.

As the cam 106 rotates it acts upon the roller 102 to control the pivotal position of the bellcrank 88, and as previously stated the end portion 96 of the bellcrank arm 92 acts upon the last ball 64′ to control the movement of the balls 64 in the ball track. The cam 106 is rotated through one revolution about the axis of the shaft 108 during each record change cycle, i.e., each time a new record R is to be lowered to the turntable 28 for playing. Any suitable mechanism (not shown) may be provided for intermittently rotating the cam 106. It is common in known types of record changers to provide a drive mechanism including a large diameter drive gear which is rotated one revolution during each record change cycle in order to effect various operations incident to the lowering of a new record to the turntable, and if desired the cam 106 may be mounted from such a large diameter drive gear for rotation therewith.

In operation, the cam 106 and bellcrank lever 88 are normally positioned as shown in solid lines in FIGURE 2, and in this position the steel balls 64 are maintained in their upper positions so as to be disposed mainly in the vertical ball track portion 76 within the lower end of the spindle body 22. The first ball 64″ is disposed immediately beneath the lower rod portion 34 of the finger carrier 30 so as to maintain the finger carrier and the primary supporting fingers 26 in their upper operative positions as shown in FIGURE 1. With the parts positioned as in FIGURE 1, the cap 52 is disposed in its upper inoperative position with the depending fingers 54 retracted, and the stack of records R is supported on the upper storage portion of the spindle by the supporting fingers 26.

During a record change cycle when it is desired to lower a new record to the turntable 28 for playing, the cam 106 is rotated one revolution about the axis of the shaft 108, and the cam track 104 acts upon the roller 102 to pivot the bellcrank lever 88 from the position shown in solid lines in FIGURE 2 to the position shown in dash lines therein, and then back again to its original position. As the bellcrank lever 88 pivots, the end portion 96 of the bellcrank arm 92 moves initially to the left as viewed in FIGURE 1 until it reaches its extreme position as shown in FIGURE 3, and during such movement the balls 64 move down by gravity into the horizontal track portion 72 as also shown in FIGURE 3. When the steel balls 64 move downwardly as described, the finger carrier assembly 30 including the supporting fingers 26 moves downwardly to lower the bottom record in the stack, the remainder of the record stack being supported by the depending fingers 54 of the cap 52, it being understood that the moment the fingers 26 begin their downward movement the cap 52 moves downwardly to expand the fingers 54 outwardly into engagement with the next-to-lowermost record in the stack.

If desired, the cam 106 may be temporarily stopped with the primary supporting fingers 26 in the positions shown in dash lines in FIGURE 1 in order to permit sensing the size of the record being lowered, and thereafter the rotation of the cam is continued so that the steel balls 64 and also the finger carrier 30 move downwardly due to gravity until they reach the positions shown in FIGURE 3. When the supporting fingers 26 reach the level of the turntable 28 they are cammed inwardly to retracted positions within the spindle body 22 thus releasing the record thereon to the turntable 28 for playing. Further rotation of the cam 106 through its single revolution causes the bellcrank lever 88 to be returned to the position shown in solid lines in FIGURE 2, whereby the balls 64 are pushed back up into the vertical track portion 76 to return the finger carrier 30 and supporting fingers 26 to the positions of FIGURE 1. When the fingers 26 are returned to the position of FIGURE 1, the cap 52 will be raised slightly to retract the depending fingers 54 thereby releasing the record stack to the supporting fingers 26.

It will be understood that the records on the upper storage portion of the spindle 20 are lowered one at a time to the turntable 28 for playing, and each record is lowered the entire distance to the turntable in order to eliminate the need for dropping the records. However, because the fingers 26 must move through a vertical stroke from the position shown in FIGURE 1 to the position shown in FIGURE 3, the mechanism for actuating such fingers must have a similar stroke. If the actuating mechanism moved solely through a vertical stroke, then when such actuating mechanism was in its lowermost position it would project a substantial distance below the lower end of the spindle body 22, thereby increasing by a considerable amount the overall vertical space required to accommodate the record changer. The actuating mechanism of the present invention comprising the plurality of steel balls 64 and the curved ball track having a horizontal track portion 72 are highly advantageous in this respect, since the balls move from the lower end of the spindle 22 into the horizontal track portion 72 and in this manner provide the necessary substantial stroke for the fingers 26 while keeping the vertical dimensions of the overall mechanism to a minimum.

While I have illustrated my invention in a preferred form, I do not intend to be limited to that form, except insofar as the appended claims are so limited, since modifications coming within the scope of my invention will be readily suggested to others with my disclosure before them.

I claim:

1. In a self-supporting record changer center spindle of the type having a plurality of retractable record supporting fingers which normally project outwardly through vertical slots in a spindle body to support a stack of records on an upper storage portion of the spindle and which are movable downwardly to transport the lowermost record of the stack to a turntable for playing, the improvement comprising, in combination, finger carrier means for carrying said plurality of record supporting fingers, said finger carrier means being disposed within said spindle body for vertical movement therein conjointly with said fingers, actuating means disposed beneath said carrier means in engagement therewith for controlling the vertical position of said carrier means, track means defining a multi-directional path for said actuating means, said track means having a vertical portion comprising the lower end of said spindle body and having a non-vertical portion in communication with said lower end of said spindle body, and means operative during a record change cycle for moving said actuating means along said path to control vertical movement of said carrier means within said spindle body.

2. In a self-supporting record changer center spindle of the type having a plurality of retractable record supporting fingers which normally project outwardly through vertical slots in a spindle body to support a stack of records on an upper storage portion of the spindle and which are movable downwardly to transport the lowermost record of the stack to a turntable for playing, the improvement comprising, in combination, finger carrier means for carrying said plurality of record supporting fingers, said finger carrier means being disposed within said spindle body for vertical movement therein conjointly with said fingers, actuating means disposed beneath said carrier means in engagement therewith for controlling the vertical position of said carrier means, track means defining a multi-directional path for said actuating means, said track means having a vertical track portion comprising the lower end of said spindle body, a generally horizontal track portion, and an arcuate track portion joining said vertical and horizontal portions, and means operative during a record change cycle for moving said actuating means along said path to control vertical movement of said carrier means within said spindle body.

3. In a self-supporting record changer center spindle of the type having a plurality of retractable record supporting fingers which normally project outwardly through vertical slots in a spindle body to support a stack of records on an upper storage portion of the spindle and which are movable downwardly to transport the lowermost record of the stack to a turntable for playing, the improvement comprising, in combination, finger carrier means for carrying said plurality of record supporting fingers, said finger carrier means being disposed within said spindle body for vertical movement therein conjointly with said fingers, a train of balls disposed within the lower end of said spindle body beneath said carrier means for controlling the vertical position of said carrier means, track means defining a multi-directional path for said train of balls, said track means having a vertical portion comprising the lower end of said spindle body and having a non-vertical portion in communication with said lower end of said spindle body, and means operative during a record change cycle for moving said train of balls along said path to control vertical movement of said carrier means within said spindle body.

4. In a self-supporting record changer center spindle of the type having a plurality of retractable record supporting fingers which normally project outwardly through vertical slots in a spindle body to support a stack of records on an upper storage portion of the spindle and which are movable downwardly to transport the lowermost record of the stack to a turntable for playing, the improvement comprising, in combination, finger carrier means for carrying said plurality of record supporting fingers, said finger carrier means being disposed within said spindle body for vertical movement therein conjointly with said fingers, a train of balls disposed within the lower end of said spindle body beneath said carrier means for controlling the vertical position of said carrier means, track means defining a multi-directional path for said train of balls, said track means having a vertical track portion comprising the lower end of said spindle body, a generally horizontal track portion, and an arcuate track portion joining said vertical and horizontal portions, and means operative during a record change cycle for moving said train of balls along said path to control vertical movement of said carrier means within said spindle body.

5. In a self-supporting record changer center spindle of the type having a plurality of retractable record supporting fingers which normally project outwardly through vertical slots in a spindle body to support a stack of records on an upper storage portion of the spindle and which are movable downwardly to transport the lowermost record of the stack to a turntable for playing, the improvement comprising, in combination, finger carrier means for carrying said plurality of record supporting fingers, said finger carrier means being disposed within said spindle body for vertical movement therein conjointly with said fingers, a train of balls disposed within the lower end of said spindle body beneath said carrier means for controlling the vertical position of said carrier means, the first ball in said train of balls being in engagement with said carrier means, track means defining a multi-directional path for said train of balls, said track means having a vertical portion comprising the lower end of said spindle body and having a non-vertical portion in communication with said lower end of said spindle body, and actuating means operative during a record change cycle for moving said train of balls along said path to control vertical movement of said carrier means within said spindle body, said actuating means being in engagement with the last ball in said train of balls, and said actuating means being movable in one direction to push said train of balls up into said spindle body to raise said finger carrier means and being movable in the opposite direction to permit said train of balls and said carrier means to move downwardly in said spindle body under the force of gravity.

6. In a self-supporting record changer center spindle of the type having a plurality of retractable record supporting fingers which normally project outwardly through vertical slots in a spindle body to support a stack of records on an upper storage portion of the spindle and which are movable downwardly to transport the lowermost record of the stack to a turntable for playing, the improvement comprising, in combination, finger carrier means for carrying said plurality of record supporting fingers, said finger carrier means being disposed within said spindle body for vertical movement therein conjointly with said fingers, a train of balls disposed within the lower end of said spindle body beneath said carrier means for controlling the vertical position of said carrier means, the first ball in said train of balls being in engagement with said carrier means, track means defining a multi-directional path for said train of balls, said track means having a vertical track portion comprising the lower end of said spindle body, a generally horizontal track portion, and an arcuate track portion joining said vertical and horizontal portions, and actuating means operative during a record change cycle for moving said train of balls along said path to control vertical movement of said carrier means within said spindle body, said actuating means being in engagement with the last ball in said train of balls, and said actuating means being movable in one direction to push said train of balls up into said spindle body to raise said finger carrier means and being movable in the opposite direction to permit said train of balls and said carrier means to move downwardly in said spindle body under the force of gravity.

7. In a self-supporting record changer center spindle of the type having a plurality of retractable record supporting fingers which normally project outwardly through vertical slots in a spindle body to support a stack of records on an upper storage portion of the spindle and which are movable downwardly to transport the lowermost record of the stack to a turntable for playing, the improvement comprising, in combination, finger carrier means for carrying said plurality of record supporting fingers, said finger carrier means being disposed within said spindle body for vertical movement therein conjointly with said fingers, a train of balls disposed within the lower end of said spindle body beneath said carrier means for controlling the vertical position of said carrier means, the first ball in said train of balls being in engagement with said carrier means, track means defining a multi-directional path for said train of balls, said track means having a vertical track portion comprising the lower end of said spindle body, a generally horizontal track portion, and an arcuate track portion joining said vertical and horizontal portions, a pivotally mounted lever having an arm in engagement with the last ball in said train of balls, said lever being movable in one direction to push said train of balls up into said spindle body to raise said finger carrier means and being movable in the opposite direction to permit said train of balls and said carrier means to move downwardly in said spindle body under the force of gravity, and rotatable cam means operative during a record change cycle for pivoting said lever first in said opposite direction and then in said one direction.

References Cited

UNITED STATES PATENTS

| | | | |
|---|---|---|---|
| 2,626,157 | 1/1953 | Jablonski | 274—10 |
| 3,130,498 | 4/1964 | Hezler | 33—23 |

LEONARD FORMAN, *Primary Examiner.*

HARRY N. HAROIAN, *Examiner.*